United States Patent

Kawamoto et al.

[11] Patent Number: 5,163,528
[45] Date of Patent: Nov. 17, 1992

[54] WHEEL MOTOR PROVIDED WITH A REDUCTION GEAR

[75] Inventors: Mutsumi Kawamoto, Tokyo; Satoru Tanaka, Anjo, both of Japan

[73] Assignee: Aisun AW Co., Ltd., Japan

[21] Appl. No.: 717,195

[22] Filed: Jun. 19, 1991

[30] Foreign Application Priority Data

Nov. 20, 1990 [JP] Japan .................. 2-314913
Nov. 20, 1990 [JP] Japan .................. 2-314914

[51] Int. Cl.⁵ .............................................. B60K 7/00
[52] U.S. Cl. .................................... 180/65.5; 310/83; 310/67 R
[58] Field of Search ............ 180/65.5, 65.6, 65.7; 310/80, 83, 67 R, 67 A

[56] References Cited

U.S. PATENT DOCUMENTS 3,812,928  5/1974  Rockwell et al. .............. 310/83 X
4,402,374  9/1983  Knur et al. ..................... 180/65.7

FOREIGN PATENT DOCUMENTS 3620363  12/1987  Fed. Rep. of Germany ..... 180/65.5
62-175217  7/1987  Japan.
1066847  1/1984  U.S.S.R. ............................ 180/65.5
1382425  1/1975  United Kingdom ............... 180/65.5

Primary Examiner—Richard Lorence
Assistant Examiner—William O. Trousdell

[57] ABSTRACT

A wheel motor provided with a reduction gear includes a stator fixed to a casing, a hollow cylindrical rotor supported by the casing through a bearing, an output flange supported by the casing through a double row angular ball bearing and attached to a wheel, and reduction gearing having an input gear wheel supported by the rotor and an output gear wheel supported by the output flange and disposed in a hollow in the rotor. The rotor has a thin-wall edge portion and a second, opposing edge portion. The thin edge portion and the opposing edge portion form two axially spaced points at which the rotor is rotatably supported by ball bearings.

6 Claims, 7 Drawing Sheets

WHEEL MOTOR PROVIDED WITH A REDUCTION GEAR

BACKGROUND OF THE INVENTION

1. Field of the Invention

The present invention relates to a wheel motor provided with a reduction gear for use in an electric automobile.

2. Description of the Prior Art

In recent years, in view of environmental problems, electric automobiles have been extensively developed. Several types of electric automobiles have been developed. In one type, an electric motor is substituted for a conventional engine and is connected to a drive shaft, or the electric motor is connected to a power transmission shaft to drive a pair of front wheels or rear wheels. In another type, plural wheel motors provided with reduction gears or mechanisms are used, with each motor being directly connected to a corresponding wheel through reduction gears.

The latter type employing plural wheel motors provided with reduction gears has been described in Japanese Laid-Open Patent Publication No. 62-175217. That publication describes an arrangement wherein each reduction gear is located inside a wheel and axially (i.e. laterally) outside the motor. Such wheel motors and reduction gears are used in dump trucks for mines and other applications associated with duplex tires. In such applications there are no severe restrictions on the dimensions of the driving mechanisms.

However, if one were to attempt to apply the above wheel motors reduction gears to general use automobile wheels, the motor would protrude from each wheel (because the wheel is only a single tire wheel) and thus the motor would be susceptible to damage if a wheel leaves the road and also susceptible to damage by a stone striking the wheel under ordinary driving conditions.

Further, in wheel motors provided with reduction gears, it is necessary to prevent interference between the vehicle body and the motor and reduction gears during vertical movement and steering of the wheels. These considerations dictate a compact design for the motor and reduction gear to allow installation in a limited space.

In electric automobiles, it is also necessary to use motors having small and light structures as well as large output torques to obtain high power relative to the vehicle weight.

It is therefore an object of this invention to provide a wheel motor provided with reduction gearing which overcomes the above-noted problems and in which the motor dimensions are reduced, and high output power and a compact structure are achieved.

SUMMARY OF THE INVENTION

The wheel motor provided with reduction gearing according to the present invention includes a stator fixed to a casing, a hollow cylindrical rotor supported by the casing through a bearing, an output flange attached to a wheel and supported by the casing through a double row angular ball bearing, a reduction gear disposed in the hollow of the rotor and having an input gear wheel supported by the rotor and an output gear wheel supported by the output flange, the rotor having one end provided with a thin-walled portion, the thin-walled portion and the opposite end of the rotor forming two axially opposing points at which the rotor is rotatably supported by ball bearings.

Employment of a hollow rotor in which the reduction gear is disposed enables a flat rotor shape and reduction of overall axial length. Since one edge portion of the rotor is formed with a substantially thinner wall than the opposite edge portion of the rotor, and the rotor is supported at two axially spaced, opposing points near its outer periphery, inclination of the rotor can be reduced thus stabilizing performance of the wheel motor.

These and other objects and features of the invention will become more apparent form the following description of preferred embodiments with reference to the accompanying drawings.

DETAILED DESCRIPTION OF THE PREFERRED EMBODIMENTS

Figure 1:
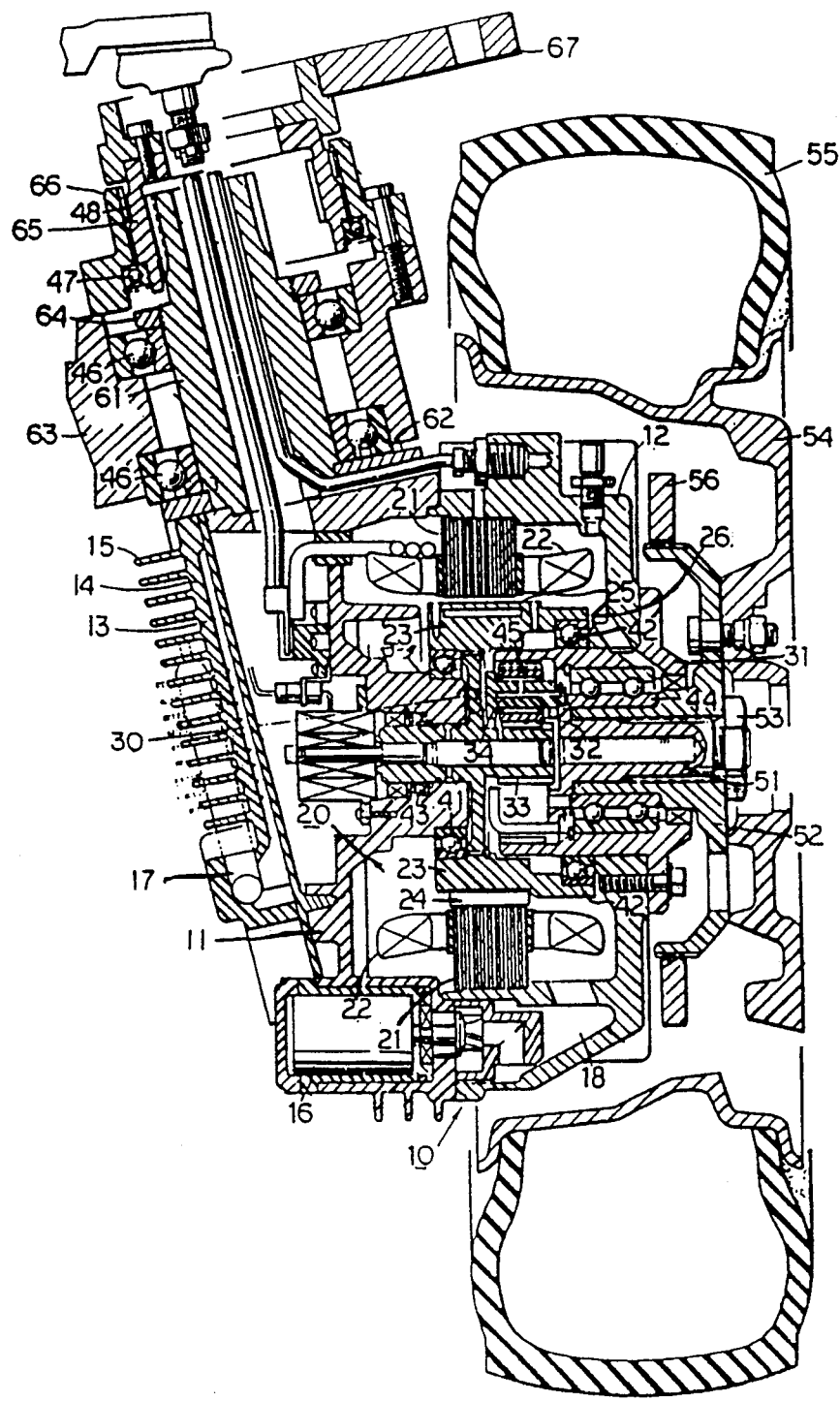
FIG. 1 is a cross-section illustrating a wheel motor provided with reduction gearing in accordance with one embodiment of the present invention.

Referring to FIG. 1, a casing assembly or main body 10 has a two-piece structure with a cylindrical housing 11 on a support side and a housing 12 on a wheel side, which are held together by bolts (not shown). A plate 13 and a cover 14 are held to the side of the housing 11 opposite the wheel side housing 12 by bolts (not shown). The housing 11 is held to a support 61 by bolts 62. An oil pump motor 16 is disposed in a bottom part of the housing 11. The plate 13 and the cover 14 form an oil passage therebetween, through which oil from an oil sump 18 at the bottom is circulated and cooled. In order to cool the oil, the cover 14 is provided on its outer surface with a large number of cooling fins 15 and a heat pipe 17. The casing assembly 10 houses an electric motor 20 having a flat and hollow rotor 23 and epicyclic reduction gearing 30 accommodated in the hollow rotor 23.

The electric motor 20 has a stator 21 attached to the inner wall of the housing 12 and a coil 22 wound around the stator 21. The rotor 23 of the electric motor 20 includes a hollow iron core around which permanent magnets 24 are retained by a band clamp 25. The rotor 23 is also provided at one end with a thin-walled portion 26 projecting axially beyond the permanent magnets 24, and is rotatably supported at this thin-walled portion 26 and at its opposite end. In the illustrated embodiment, the end opposite thin-walled portion 26 is supported by a ball bearing 41 mounted in the housing 11 and the thin-walled end is supported by a ball bearing 42 fitted to a ring gear 31 of the epicyclic reduction gearing 30. The ring gear 31 of the epicyclic reduction gearing 30 is press-fitted into the housing 12 and is held thereto by bolts. A sun gear 33 of the epicyclic reduction gearing 30 is supported by a ball bearing 43 fitted in the housing 11, and is splined into the hollow rotor 23. A pinion shaft 34 is connected to an output carrier 51 forming an output rotation shaft, and rotatably carries a pinion gear 32 through a needle bearing 45 which is continuously meshed with the ring gear 31 and the sung gear 33.

An output flange 52 is splined onto the output carrier 51 and is axially retained by a nut 53. The flange 52 is supported by the ring gear 31 through the double row angular bearing 44 located axially outside the pinion gear 32. A brake disk 56 is splined to the output flange 52, and a wheel 54 carrying a tire 55 is fixed to the flange 52 by bolts and nuts.

Support 61 is a cylindrical member having external splines at its upper portion and is rotatably supported by a knuckle 63 by means of the angular bearing 46 and a nut 64 so as to bear a thrust load. An internal cover 66 is bolted to the knuckle 63. An internal gear wheel 65 having internal teeth is bolted to a steering lever 67 so that the ball baring 47 and the needle roller bearing 48 rotatably support the internal cover 66 and the external teeth of the support 61 are meshed with the internal teeth of the internal gear wheel 65 to form a velocity increasing gear. In these structures, as the lever 67 is moved, the internal gear wheel 65 rotates through an angle, and the support 61 rotates through an increased angle, e.g. doubled.

In the above structure, the ring gear 31 is bolted to the housing 12, inside which gear the double row angular bearing 44 supports the output flange 52 and the output carrier 51, and the rotor 23 of the electric motor 20 is splined to the sun gear 33 of the epicyclic reduction gearing 30. Therefore, it is possible to prevent shift of the center of the double row angular bearing 44 and thus inclination of the shaft, resulting in high concentricity for the epicyclic reduction gearing 30.

Since the epicyclic reduction gearing is disposed in the hollow of the rotor, the axial length of the unit can be reduced to form a flat and compact structure, which enables high speed rotation and improved acceleration and deceleration. Since the rotor is flat and has a large diameter, the span between the two supporting points is relatively short with respect to the diameter, a shift of the centers of the housing may cause inclination of the rotor, which in turn would cause deviation in the distance between the stator and the magnets of the rotor, resulting in deviation of the torque characteristics. In view of this potential problem, the present invention provides a rotor with an edge portion having a wall thickness substantially smaller than that of the remainder of the cylindrical rotor. The rotor is axially and radially supported at the two points at its opposite ends, near the outer peripheries of the rotor. Therefore, the supported edge portions have large diameters and the concentricity is increased, so that the inclination of the rotor and the variation in the space between the rotor and the stator can be minimized. Accordingly, it is possible to prevent deviations in performance, which might otherwise be caused by inclination of the rotor.

Now, the assembly of the rotor utilizing the thin wall edge portion will be described below.

Figure 2A:
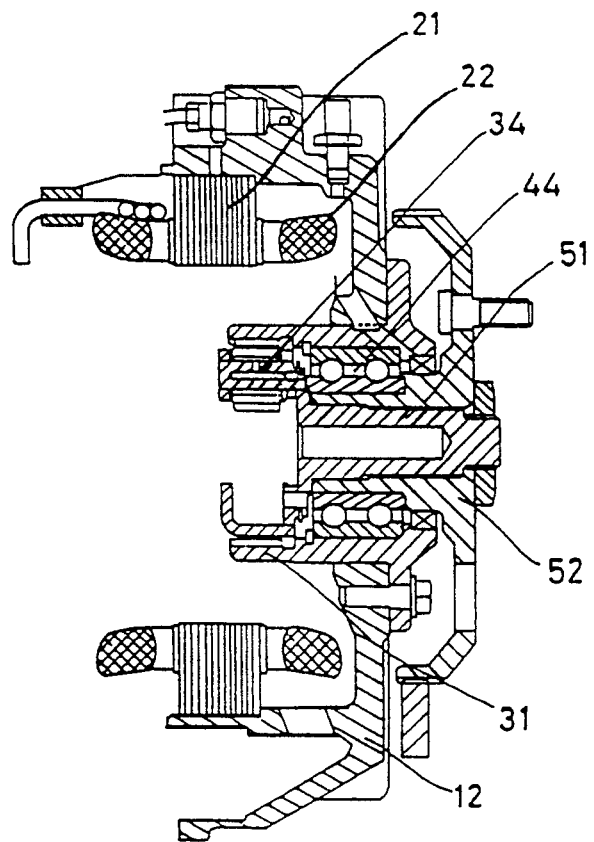
FIG. 2 shows, in cross-section, one embodiment of the motor and reduction gearing of the present invention as including a stator side portion (FIG. 2a) and a rotor side portion (FIG. 2b)
Figure 2B:
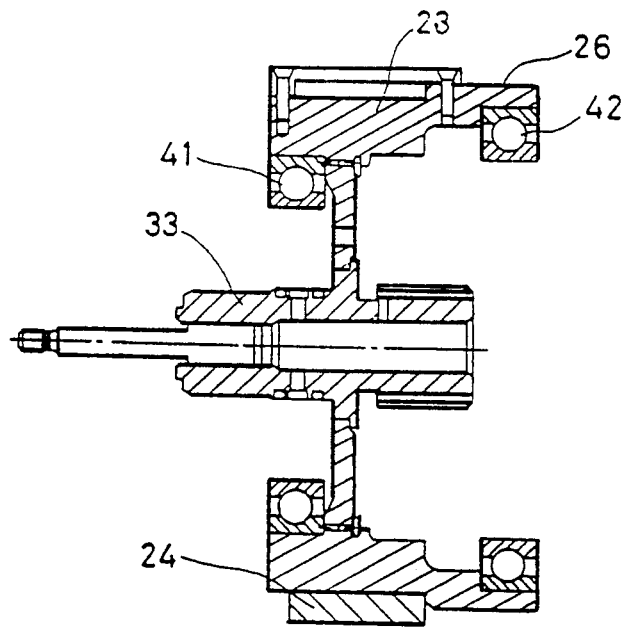

FIG. 2 illustrates the stator side (FIG. 2a) and the rotor side (FIG. 2b), and FIG. 3 is a view illustrating the steps in assembly of the rotor.

Prior to assembling the rotor, the ring gear 31 and the stator 21 are press-fitted into the housing 12, as shown in FIG. 2(a) then the pinion gear 32, double row angular bearing 4, output carrier 51 and output flange 52 are assembled into it. In a separate process, the sun gear 33, ball bearings 41 and 42 and other elements are assembled in the rotor 23, as shown in FIG. 2(b).

Figure 3A:
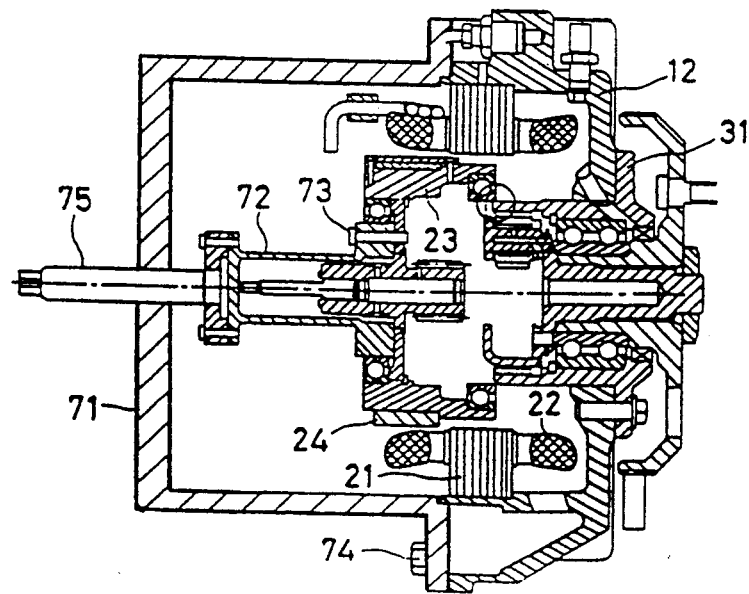
FIGS. 3(a), 3(b) and 3(c) are views illustrating the assembly process for the motor and reduction gearing.

Then, as shown in FIG. 3(a), an assembling jig 72 is attached to the rotor assembly by bolts 73 and an assembly jig 71 is attached to the housing 12 by bolts 74. Then, the rotor assembly is assembled with the housing 12 by tightening the bolt 75. At the initial stage of the tightening of the bolt 75, the ball bearing 42 installed in the thin portion 26 of the rotor 23 comes into contact with the end of the ring gear 31 to guide the rotor 23, as shown in FIG. 3(a). In this stage, the permanent magnets 24 of the rotor 23 are not yet facing the stator and the sun gear is not yet meshed with the pinion gear.

Figure 3B:
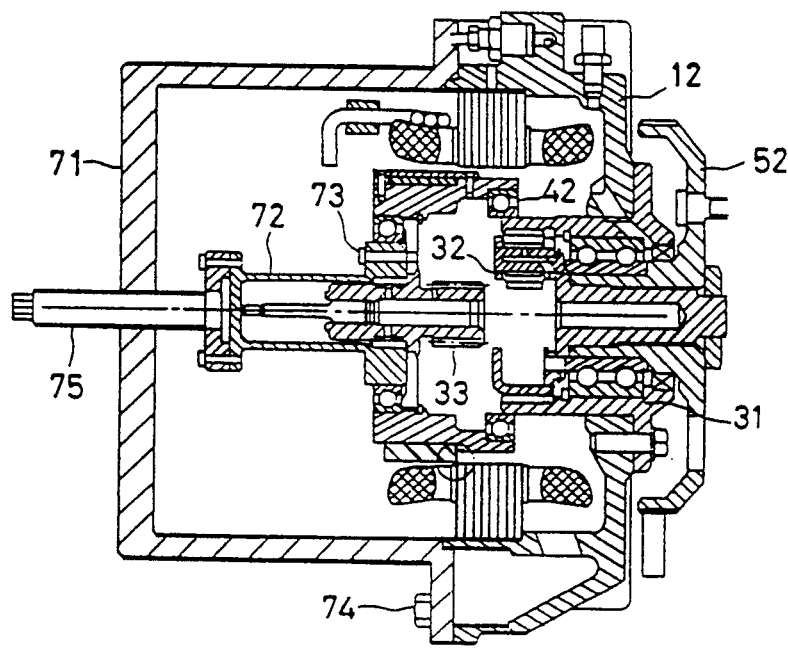

When the bolt 75 is further tightened, the permanent magnets 24 slide into position adjacent the stator 21, as shown in FIG. 3(b), so that an attraction force is produced between the permanent magnets 24 and the stator iron core. However, since the rotor 23 is supported at two points, i.e. the contact point between the ball bearing 42 and the ring gear 31 and the contact point between the assembly jig 71 and the bolt 75, the rotor 23 can be inserted while maintaining a clearance between the permanent magnets 24 and the stator 21, thereby preventing contact between them.

Figure 3C:
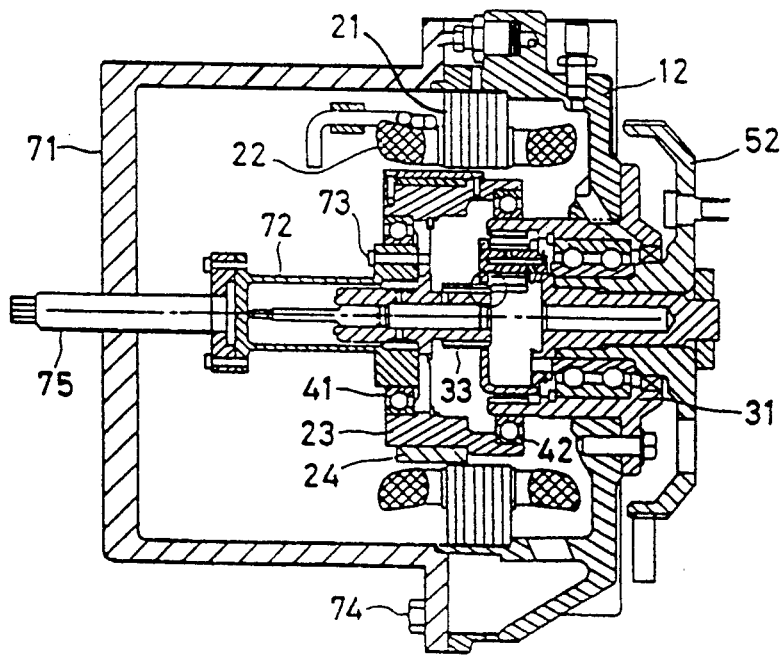

Then, as shown in FIG. 3(c), the sun gear 31 and the pinion gear 32 are meshed together, and the rotor 23 is completely assembled into the housing 12.

Figure 4:
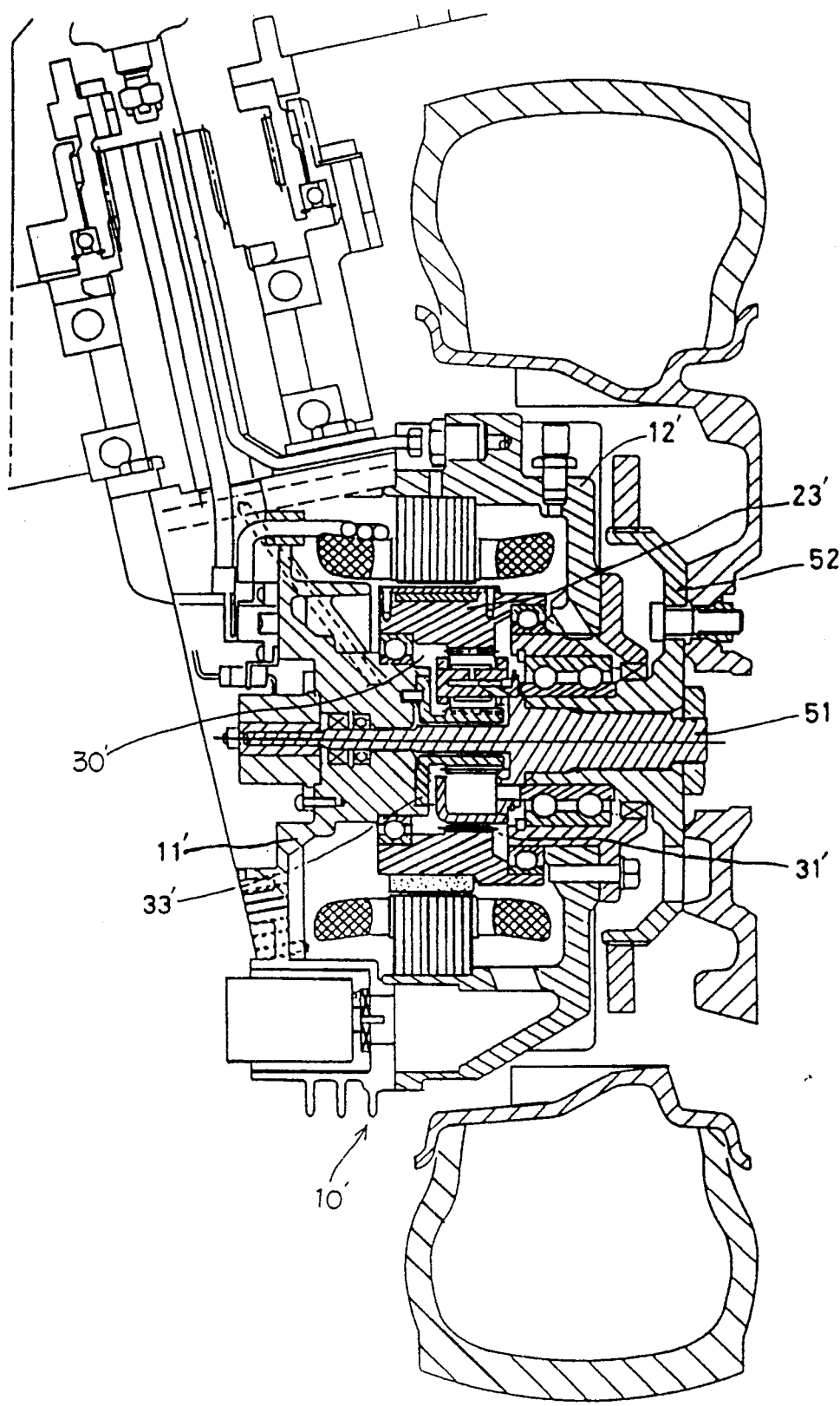
FIG. 4 is a cross-section illustrating a wheel motor provided with reduction gearing in accordance with another embodiment of the present invention.
Figure 5:
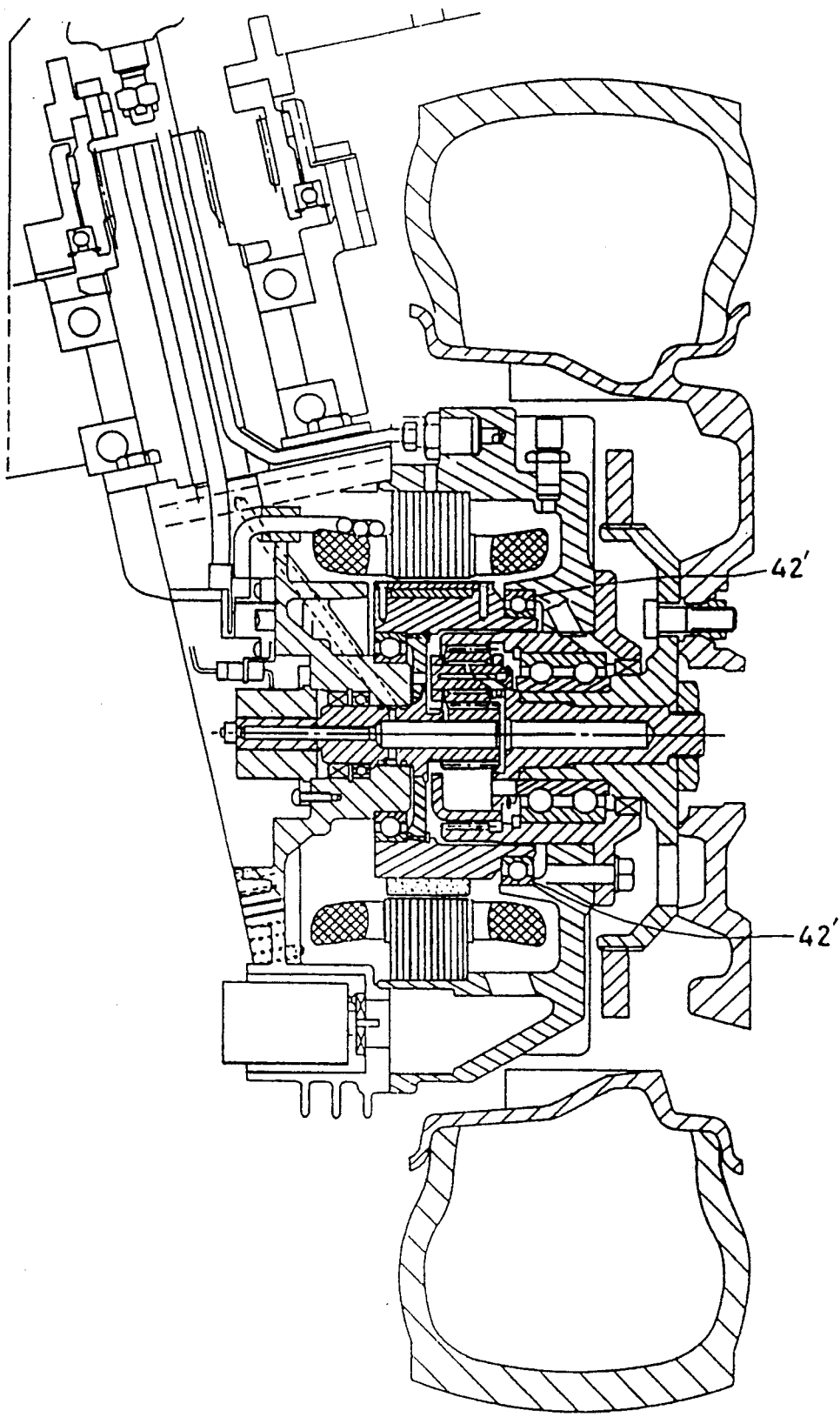
FIG. 5 is a cross-section illustrating a wheel motor provided with reduction gearing in accordance with still another embodiment of the present invention.
Figure 6:
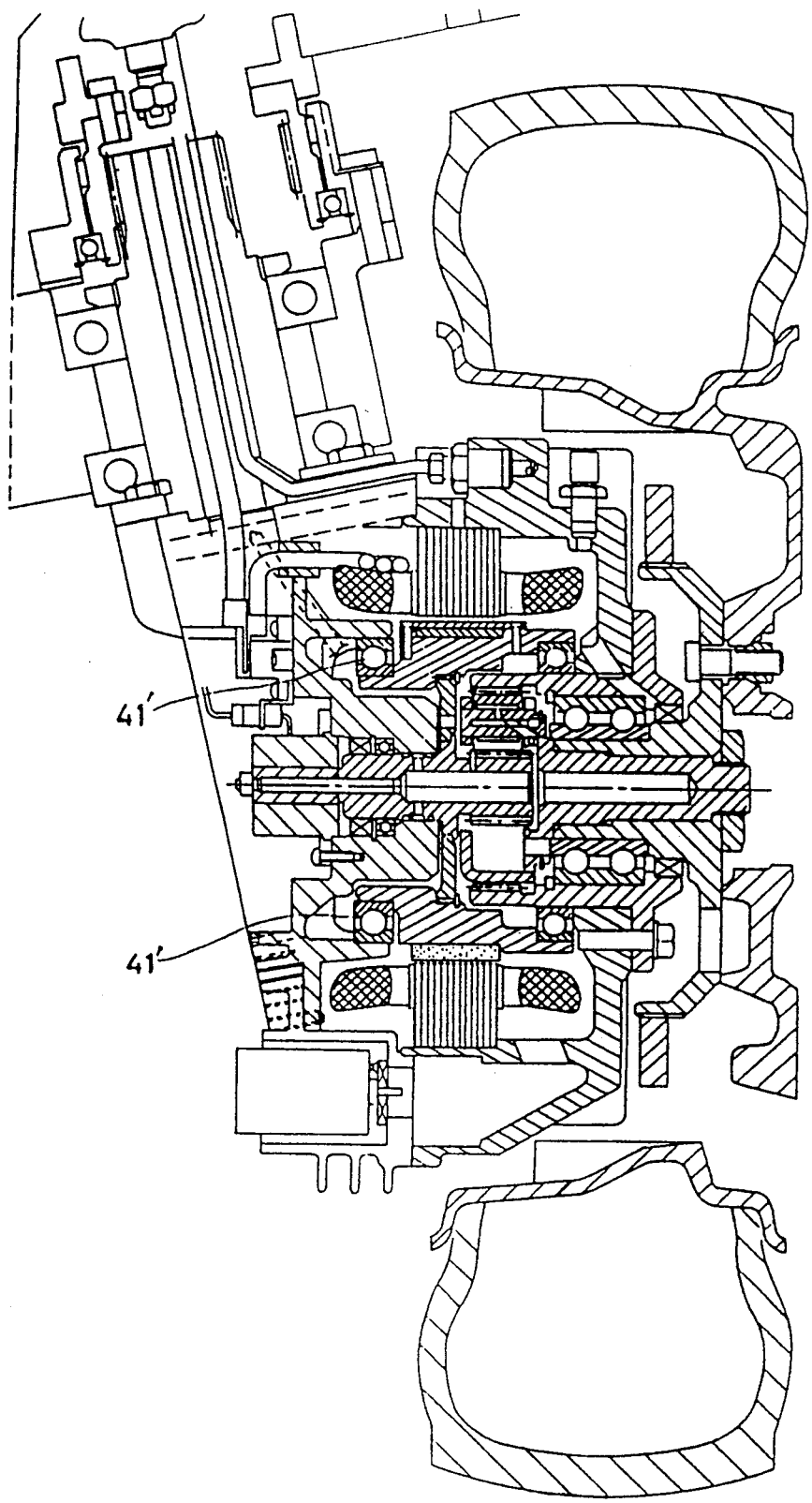
FIG. 6 is a cross-section illustrating a wheel motor provided with reduction gearing in accordance with yet another embodiment of the present invention.

FIGS. 4, 5 and 6 are cross-sections illustrating different embodiments of the wheel motor provided with reduction gearing according to the present invention.

In the embodiment shown in FIG. 4, gear wheels for the input and reaction of the epicyclic reduction gearing 30' are arranged in a reverse relationship with respect to those in FIG. 1. Specifically, the ring gear 31' of the epicyclic reduction gearing 30' is independent from the housing 12' and is disposed in the hollow of rotor 23'. The reaction sun gear 33' is fixed by bolts to the housing 11' which forms the casing assembly 10'.

In the embodiment shown in FIG. 5, the outer periphery of the thin portion of the rotor is supported by the housing through a ball bearing 42'. In the embodiment shown in FIG. 6, a thin portion is formed at both edges of the rotor and the rotor is additionally supported by the housing through a ball bearing 41'.

It should be noted that the invention is not restricted to the embodiments described above, and various modifications can be made. For example, although the embodiments described above utilize the ring gear or the sun gear as the input gear wheel or member, other combinations may be employed. Further, the reduction gearing or a mechanism other than the epicyclic reduction gearing may be disposed in the hollow rotor.

According to the invention, as described hereinabove, a flat and hollow rotor is employed and the reduction gear is disposed in the hollow thereof, so that the overall axial length can be reduced. Therefore, the invention may be applied to general use automobiles having wheels of the single tire type and, thus, the motors are protected from damage even when the wheels leave the road or when a stone strikes the wheel under ordinary driving conditions.

Further, the rotor has at least one thin-walled edge portion and this thin-walled edge portion and the opposing edge portion are supported by bearings disposed so as to confine the rotor against axial movement. Therefore, variations in the gap between the stator and the rotor can be minimized thereby resulting in more stable performance of the motor.

What is claimed is:

1. Wheel motor and reduction gear apparatus for use in an electric vehicle, said apparatus comprising:
    a casing;
    a stator fixed to said casing;
    a coil wound around said stator;
    a hollow cylindrical rotor located radially aligned with and radially inward of said stator and supported by said casing through bearings;
    an output flange supported by said casing through at least one bearing and including means for attaching a wheel;
    a reduction gear mechanism for transferring the torque generated by rotation of said rotor for said rotor to said output flange, said reduction gear mechanism including an input gear wheel connected to and driven by said rotor and an output gear wheel meshed with and driven by said input gear, said input gear and said output gear being rotatably mounted within the hollow of said rotor; and
    connecting means for connecting said output flange with said output gear, whereby said output flange is driven by said rotor through said input and output gears and said connecting means.

2. The apparatus of claim 1 further comprising a ring gear fixed to said casing, wherein said input gear is a sun gear and said output gear is a pinion gear meshed with said sun gear and said ring gear and wherein said connecting means includes a carrier for said pinion gear.

3. The apparatus of claim 2 wherein said rotor has first and second opposing edge portions, and said first edge portion of said rotor is supported by said casing through a bearing mounted on said ring gear.

4. The apparatus of claim 3 wherein said rotor has first and second edge portions, and said first edge portion is substantially thinner than said second edge portion.

5. The apparatus of claim 1 wherein said rotor has first and second opposing edge portions, and said first edge portion is substantially thinner than said second edge portion.

6. The apparatus of claim 1 wherein said rotor is supported at both its opposing edge portions and said input gear wheel is splined into said hollow rotor.

* * * * *

UNITED STATES PATENT AND TRADEMARK OFFICE
CERTIFICATE OF CORRECTION

PATENT NO. : 5,163,528
DATED : November 17, 1992
INVENTOR(S) : KAWAMOTO et al It is certified that error appears in the above-identified patent and that said Letters Patent is hereby corrected as shown below:

Col. 1, line 33, after "motors" insert --and--.

Col. 3, line 24, delete "baring" and insert --bearing--.

Col. 4, line 4, delete "4" and insert --44--.

Col. 5, line 21, delete "for" and insert --form--.

Signed and Sealed this

Seventh Day of December, 1993

Attest:

BRUCE LEHMAN

Attesting Officer

Commissioner of Patents and Trademarks